United States Patent Office 2,837,567
Patented June 3, 1958

2,837,567

PREPARATION OF β,β'-OXYDIPROPIONIC ACID

Keith M. Taylor, La Marque, Tex., assignor to Monsanto Chemical Company, St. Louis, Mo., a corporation of Delaware No Drawing. Application December 29, 1955
Serial No. 556,043

2 Claims. (Cl. 260—535)

This invention relates to β,β'-oxydipropionic acid and more specifically to an improved process for its preparation.

It is known in the art that β,β'-oxydipropionic acid can be prepared by the acidic hydrolysis of β,β'-oxydipropionitrile. The reaction has been carried out in an aqueous medium and the β,β'-oxydipropionic acid recovered by extraction therefrom with a suitable solvent. This process is costly, primarily because of the time required to completely extract the β,β'-oxydipropionic acid from the reaction mixture.

It is an object of this invention to provide an improved process for the preparation of β,β'-oxydipropionic acid.

It is a further object of this invention to provide an improved process for the acidic hydrolysis of β,β'-oxydipropionitrile to form β,β'-oxydipropionic acid.

Other objects will become apparent from the description of the invention.

An exceptionally convenient process for the preparation of β,β'-oxydipropionic acid has now been discovered which comprises passing substantially anhydrous HCl into a mixture of β,β'-oxydipropionitrile, water and 1,2-dichloroethane, removing the ammonium chloride formed by filtration and separating the β,β'-oxydipropionic acid from the reaction mixture by distillation of the water and 1,2-dichloroethane therefrom. The following example illustrates the invention:

To a flask equipped with a condenser, stirrer and hydrogen chloride inlet tube is added 124 g. β,β'-oxydipropionitrile, 72 g. water and 320 g. 1,2-dichloroethane. Anhydrous HCl is bubbled into the mixture while maintaining the temperature at about 70° C. The reaction is continued for approximately 16 hours and then filtered to remove ammonium chloride.

An azeotrope of water and 1,2-dichloroethane is distilled from the reaction mixture at a temperature of approximately 72° C. After the water has been removed distillation is continued at approximately 83° C. until all of the 1,2-dichloroethane is removed. An excellent yield of substantially pure β,β'-oxydipropionic acid remains which can be further purified, if desired, by recrystallization from an ether-petroleum ether mixture.

A substantial variation in the reaction conditions and quantity of reactants set forth in the preceding example is possible without departing from the scope of this invention. At least 4 molecular proportions of water for each molecular proportion of β,β'-oxydipropionitrile should be used. An excess of water, for example, as much as 8 molecular proportions of water for each molecular proportion of β,β'-oxydipropionitrile, can be used if desired.

Even though water is present in the reaction mixture, best results are obtained when substantially anhydrous HCl is used. The use of anhydrous HCl facilitates obtaining a reaction mixture in which both the water and 1,2-dichloroethane are saturated with HCl thereby assuring substantially complete precipitation of the ammonium chloride formed. At least 2 molecular proportions of HCl should be used for each molecular proportion of β,β'-oxydipropionitrile. An excess of HCl is preferred in order to obtain a reaction system which is saturated with HCl.

The quantity of 1,2-dichloroethane used in the reaction is governed primarily by the solubility of the β,β'-oxydipropionic acid formed. Enough should be used to effect complete solution of the β,β'-oxydipropionic acid formed. 1,2-dichloroethane in the amount of at least twice the weight of β,β'-oxydipropionic acid theoretically possible is suitable.

The hydrolysis reaction can be carried out over a wide temperature range as, for example, from about 0° C. to about 100° C. at any particular desired pressure. Preferably the reaction is carried out at a temperature in the range of 65° C. to about 75° C.

After the reaction is complete ammonium chloride is removed by filtration. Water and 1,2-dichloroethane can then be removed by distillation leaving substantially pure β,β'-oxydipropionic acid. If desired a water-1,2-dichloroethane azeotrope may be removed and then ammonium chloride removed by filtration. Distillation can be carried out at any desired pressure. β,β'-oxydipropionic acid thus obtained is of sufficient purity for most purposes. If desired, however, it can be further purified by any method well known to those skilled in the art.

What is claimed is:

1. A process for the preparation of β,β'-oxydipropionic acid which comprises passing substantially anhydrous HCl into a mixture containing β,β'-oxydipropionitrile, at least 4 molecular proportions of water for each proportion of β,β'-oxydipropionitrile and a quantity of 1,2-dichloroethane sufficient to dissolve the β,β'-oxydipropionic acid formed, removing ammonium chloride formed, distilling therefrom water and 1,2-dichloroethane and recovering β,β'-oxydipropionic acid.

2. A process for the preparation of β,β'-oxydipropionic acid which comprises passing substantially anhydrous HCl at a temperature in the range of from about 65° C. to about 75° C. into a mixture containing β,β'-oxydipropionitrile, at least 4 molecular proportions of water for each proportion of β,β'-oxydipropionitrile and a quantity of 1,2-dichloroethane sufficient to dissolve the β,β'-oxydipropionic acid formed, removing ammonium chloride formed, distilling therefrom water and 1,2-dichloroethane and recovering β,β'-oxydipropionic acid.

REFERENCES CITED

Christian et al., J. A. C. S. vol. 70, 1948, pp. 1333–1336.
Jordan, Technology of Solvents, 1932, p. 217.